United States Patent Office 3,558,738
Patented Jan. 26, 1971

3,558,738
OLEFIN DIMERIZATION
Howard E. Dunn, Bartlesville, Okla., assignor to Phillips Petroleum Company, a corporation of Delaware
No Drawing. Filed May 5, 1969, Ser. No. 822,053
Int. Cl. C07c 3/10
U.S. Cl. 260—683.15                 9 Claims

ABSTRACT OF THE DISCLOSURE

An olefin is dimerized by contact with a catalyst formed from an organoaluminum compound and one of the following nickel complexes:

(a) a nitrosyl nickel complex;
(b) a N,N-dihydrocarbyldithiocarbamato nickel complex;
(c) a [bis]pyridinecarboxylato nickel complex;
(d) a thiobisphenol nickel complex;
(e) thiobisphenol nickel amine complex; or
(f) an amine-N-oxide nickel complex.

---

This invention relates to a method for the dimerization of olefins. In another aspect, the invention relates to a method for the dimerization of olefins in the presence of a catalyst formed from an organoaluminum compound and a nickel complex. In still another aspect, this invention relates to novel catalysts for olefin dimerization.

Many processes have been developed for olefin dimerization. However, few of the processes have provided catalysts having high activity and high selectivity for the production of olefin dimers.

Therefore, it is an object of this invention to provide a method for the dimerization of olefins. It is another object of this invention to provide novel catalysts for the production of olefin dimers.

Other objects, advantages and features of my invention will be apparent to one skilled in the art from the following disclosure and claims.

I have found that $C_2$ to $C_{12}$ acyclic and cyclic olefins can be dimerized according to the process of this invention by contacting the olefin with a catalyst formed by the admixture of an organoaluminum compound represented by the formula $R_nAlY_m$ in combination with a complex of nickel, as subsequently defined, where R is an alkyl, alkenyl, aryl, or a cycloalkyl radical, or a combination thereof such as an alkaryl or aralkyl radical, having from 1 to 12 carbon atoms, Y is a halogen, $n$ can be the integer 1, 2, or 3, $m$ can be 0 or the integer 1 or 2, and the sum of $n$ and $m$ equals 3. I have further found that according to this invention a catalyst formed by the admixture of the two components disclosed above has a high selectivity for the production of dimers of olefins.

The olefins to which the present dimerization process is directed include cyclic monoolefins having up to about 12 carbon atoms per molecule and acyclic monoolefins having from about 2 to 12 carbon atoms, inclusive, where the acyclic monoolefin can be a terminal or an internal olefin, branched or unbranched, but has no branching nearer than the 3-position to the double bond. Examples of suitable monoolefins which can be used according to the present invention are ethylene, propylene, butene-1, butene-2, pentene-1, pentene-2, cyclopentene, cyclohexene, 3,4,5-trimethylcyclohexene, 3-methyl-butene-1, cycloheptene, hexene-2, heptene-1, cyclooctene, 4,4-dimethylheptene-2, decene-1, dodecene-1, and the like, and mixtures thereof. The presently preferred olefins are ethylene and propylene. Mixtures of olefins can be contacted with the catalysts to form "codimers"; for example ethylene and butylene react to form hexenes, propylene and butylene react to form heptenes, etc.

Some specific examples of organoaluminum components of the catalyst system are: methylaluminum dichloride, dimethylaluminum chloride, diethylaluminum bromide, ethylaluminum dibromide, triethylaluminum, vinylaluminum diiodide, tributylaluminum, dibutylaluminum chloride, phenylaluminum dibromide, dibenzylaluminum chloride, 4-tolylaluminum dichloride, dodecylaluminum dibromide, and the like, and mixtures thereof such as methylaluminum sesquichloride. Presently preferred aluminum compounds are organoaluminum halides particularly those containing radicals of the lower hydrocarbons such as methyl and ethyl.

The nickel complex component of the catalyst system can be represented by nickel complexes having the formula $L_2NiNOX$; where X can be any anion such as a halide, pseudohalide, alkoxide, and the like such as $Cl^-$, $Br^-$, $SCN^-$, $NC^-$, $ONC^-$, and $CH_3O^-$, where L is represented by one of the following:

(a) $R_3Q$
(b) $R_3QO$ where R is as previously defined and Q is phosphorus, arsenic, or antimony. In the formulas below where the number of R's can vary, it is to be understood that hydrogen atoms satisfy the unspecified valences when there are less than the maximum number of R groups present. Specific examples are:

bis(triphenylphosphine)nitrosyliodonickel,
bis(tributylphosphine)nitrosylbromonickel,
bis(triphenylphosphine)nitrosylthiocyanatonickel,
bis(triphenylarsine)nitrosyliodonickel,
bis(tributylphosphine oxide)nitrosylchloronickel,
bis(tridecylstilbine)nitrosylbromonickel,
bis(tricyclopentylphosphine)nitrosylchloronickel,
bis(tribenzylarsine oxide)nitrosylbromonickel,
bis(tri-o-tolylphosphine)nitrosylmethylatonickel, and the like, and mixtures thereof.

The nickel complex component of the catalyst system can also be represented by nickel complexes having the formula:

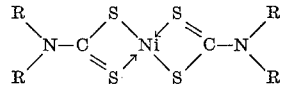

where R is as previously defined. Specific examples are:

bis(dimethyldithiocarbamato)nickel,
bis(diethyldithiocarbamato)nickel,
bis(methylethyldithiocarbamato)nickel,
bis(dicyclohexyldithiocarbamato)nickel,
bis(diphenyldithiocarbamato)nickel,
bis(di-o-tolyldithiocarbamato)nickel,
bis(dibenzyldithiocarbamato)nickel,
bis[di(2-ethylhexyl)dithiocarbamato]nickel,
bis(dibutyldithiocarbamato)nickel,
bis(didodecyldithiocarbamato)nickel, and the like, and mixtures thereof.

Such nickel complexes can be prepared in any conventional way using methods known in the art. Some are commercially available, being used as ultraviolet stabilizers for polymers.

The nickel complex component of the catalyst system can also be nickel complexes represented by the formula:

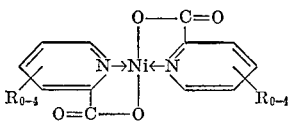

where R is as previously defined.

Some specific examples of such nickel complexes are:

bis(picolinato)nickel,
bis(4-hexylpicolinato)nickel,
bis(3,4,5-trimethylpicolinato)nickel,
bis(5-phenylpicolinato)nickel,
bis(3-methylpicolinato)nickel,
bis(4-propylpicolinato)nickel,
bis(5-benzylpicolinato)nickel,
bis(4,6-diethylpicolinato)nickel,
bis(5-cyclohexylpicolinato)nickel, and the like, and mixtures thereof.

Such nickel complexes can be prepaerd using any conventional method known in the art. For example, the method disclosed in Inorg. Chem. 3, 116, 119, 121 (1963) can be used.

The nickel complex component of the catalyst system can still further be a complexed nickel phenolate of a 2,2'-thiobisphenol having the structure:

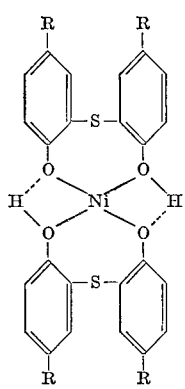

wherein R is hydrogen or as previously defined. Preferably, R is an alkyl radical.

Complexes such as this are commercially available or can be conveniently prepared by a metathetic reaction between the sodium phenolphenolate of a bis(p-alkylphenol)monosulfide and a nickel halide in an anhydrous medium. A specific example of such a nickel complex wherein the R group is a branched octyl radical is [bis-2,2'-thiobis[4-(1,1,3,3-tetramethylbutyl)phenyl]]nickel.

Yet another nickel complex component of the catalyst system can be a nickel amine complex of 2,2'-thiobisphenol having the structure:

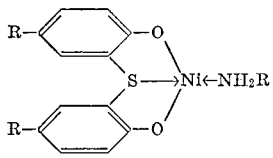

wherein R is hydrogen or as previously defined. Preferably, the R in this complex is an alkyl radical. Some compounds such as these are commercially available or can be conveniently prepared by the reaction of a 2,2'-thiobis(p-alkylphenol) and a nickel salt followed by contact with a suitable amine or ammonia. A typical example of such a nickel complex is [2,2'-thiobis[4-(1,1,3,3-tetramethylbutyl)phenyl]ato(2-)](butylamine)nickel.

Still, another nickel complex component of the catalyst system can be a nickel amine complex of 2,2'-thiobisas that which results from the reaction of 1 mole of a nickel salt with two moles of a pyridine oxide to yield a complex with the structure:

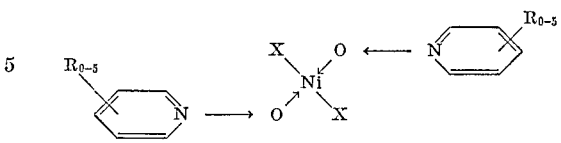

wherein R and X are as previously defined; or an analogous tertiary amine-N-oxide complex of nickel resulting from the reaction of a mole of a nickel salt $NiX_2$ with 1–2 moles of such tertiary amine-N-oxide compounds as bipyridine dioxide, phenanthroline dioxide, triethylenediamine dioxide, or quinuclidine oxide.

Such tertiary amine oxide complexes of nickel can be prepared by conventional means. For example, a mole of a nickel dichloride is stirred with about 2 moles of 2-picoline-N-oxide in absolute ethanol for about 1 hour at room temperature to yield, on chilling, crystals of the bis-(2-picoline-N-oxide)dichloronickel complex.

As indicated above, such tertiary amine-N-oxide complexes can be substituted or unsubstituted. When substituted they can contain up to about five R groups, some examples of which are methyl, ethyl, isobutyl, 2-ethylhexyl, decyl, dodecyl, vinyl, cyclopentyl, cyclohexyl, phenyl, benzyl, p-tolyl, and the like. R groups such as these are applicable to all of the complexes of the present invention.

The components of the catalyst are usually combined in proportions in a range of 0.5:1 to about 20:1 moles of aluminum compound per mole of nickel complex. Catalyst poisons in the system can be scavenged by employing even greater proportions of the organoaluminum component.

The catalyst of the present invention is prepared by combining the first and second components of the catalyst under conditions of time and temperature which permit the active catalyst to be formed. The two components of the catalyst can be mixed at any convenient temperature within the range of about −80 to about 100° C. for a period of time ranging from a few seconds up to several hours in the presence of a diluent in which both of the two components are at least partially soluble. Examples of suitable solvents or diluents are benzene, cyclohexane, chlorobenzene, methylene chloride, ethylene chloride, and the like. However, halogenated diluents are preferred. The forming of the catalyst by admixing the two components is generally carried out in an inert atmosphere and in the substantial absence of air or moisture. After the catalyst is formed, it need not be isolated but can be added directly to the reaction zone as a solution or suspension in its preparation medium. If desired, the components used to form the catalyst can be separately added, in any order, to the reaction zone either in the presence or absence of the feed olefin.

The dimerization of the olefin or mixture of olefins can take place at temperatures within the range of −80 to about 200° C., and preferably within the range of −10 to about 50° C. Normally, it is desirable to carry out the dimerization reaction under pressures ranging up to about 2000 p.s.i.g., and preferably 20–500 p.s.i.g. The dimerization can be carried out in the presence of a diluent such as that used for the catalyst preparation if desired. The time of contact of the olefin with the catalyst for the dimerization of the olefin will vary depending upon the desired degree of conversion but, generally will be within the range from about 0.1 minute to about 20 hours, preferably 5 to 120 minutes. The proportion of catalyst composition of olefin feed in the reaction zone will generally be within the range of about 0.00001 to about 0.1 mole of nickel complex per mole of olefin feed.

Any conventional contacting technique can be utilized for the olefin dimerization and batchwise or continuous operations can be utilized. After the desired degree of conversion of the olefin to the dimer, the products so formed can be separated and isolated by conventional means such as by fractionation, crystallization, adsorption, and the like. The unconverted feed material can be recycled to the reaction zone. If desired, the catalyst can be destroyed by treatment with suitable deactivating agents such as water or alcohol, prior to the separation of the products.

The dimers produced and the dimerization of olefins can be used for many purposes. For example, olefin dimers such as propylene dimers can be employed to make oxo alcohols which are used in the preparation of plasticizers. Also, propylenedimers can be cracked by conventional methods to make isoprene.

The advantages of this invention are further illustrated by the following examples. The reactants and the proportions and other specific conditions are presented as being typical and should not be construed to limit the invention unduly.

EXAMPLE I

A catalyst for the dimerization of ethylene was prepared by adding 0.0152 g. (0.05 mmole) of bis(picolinato)nickel and 40 ml. of chlorobenzene to a 300 cc. stainless steel autoclave. Ethylene was then pressured into the vessel at 20–40 p.s.i.g. and then 1.5 ml. of a one molar solution of ethylaluminum dichloride (EADC) in chlorobenzene was added. The reaction mixture proceeded for 12 minutes and the temperature rapidly rose to 180° F. despite the fact that the autoclave was cooled with circulating water. The ethylene pressure was maintained at 160–180 p.s.i.g. during the major portion of the reaction. Ten ml. of water were injected into the vessel to quench the reaction.

Gas liquid chromatographic analysis of the organic phase showed the presence of about 59.0 g. butenes, 35.7 g. hexenes and 6.9 g. octenes.

This run demonstrated that the catalyst system was very active for the dimerization of ethylene.

EXAMPLE II

A catalyst for the dimerization of propylene was prepared by adding 0.0741 g. of bis(triphenylphosphine)-nitrosyliodonickel and 20 ml. of chlorobenzene to a dry 7-ounce reaction flask fitted with a magnetic stirrer. Propylene was pressured into the flask at 30 p.s.i.g. until the liquid was saturated and then the pressure was temporarily reduced to 5 p.s.i.g. 1.5 ml. of a one molar solution of ethylaluminum dichloride in chlorobenzene was added to the flask and the pressure was returned to 30 p.s.i.g. where it was maintained for 30 minutes at a reaction temperature of 17.6° C.

At the end of the 30 minute reaction period, 10 ml. of water were added to destroy the catalyst. The organic layer was decanted and distilled at atmospheric temperature yielding 12.64 g. of product, consisting of hexenes. Two ml. of the hexenes were reduced with hydrogen over $PtO_2$. The gas-liquid chromatographic analysis of the hydrogenated product showed the presence of:

(a) 65.4 weight percent of 2-methylpentane;
(b) 27.4 weight percent of n-hexane;
(c) 6.7 weight percent of 2,3-dimethylbutane; and
(d) 0.5 weight percent of 3-methylpentane.

EXAMPLES III–X

Other propylene dimerization runs

In a manner essentially identical for that of the preceding example, propylene was dimerized in a number of additional runs using different nickel complexes. In each run 0.1 millimole of the nickel complex, 1.5 millimole of ethylaluminum dichloride, 20 ml. chlorobenzene, and propylene at 30 p.s.i.g. was used. In each run the reaction was quenched by the addition of water, the organic phase was distilled to recover the hexenes, and a sample of the hexenes was reduced with hydrogen and analyzed to learn the skeletal distribution of the dimer product. The results of these propylene dimerization runs are shown in Table I.

TABLE I.—DIMERIZATION OF PROPYLENE

| Ex. | Nickel complex | Reaction temp.,° C [2] | Reaction time, min. | Dimer yield, g. | Isomer [1] distribution, percent | | | |
|---|---|---|---|---|---|---|---|---|
| | | | | | 2-methyl pentane | n-hexane | 2,3-di-methyl butane | 3-methyl pentane |
| III | Bis (picolinato)nickel | 17.6 | 30 | 41.0 | 68.2 | 24.9 | 6.3 | 0.6 |
| IV | Bis(triphenylphosphine)nitrosyliodonickel | 17.6 | 30 | 12.6 | 65.4 | 27.4 | 6.7 | 0.5 |
| V | Bis(di-n-butyldithiocarbamato)nickel | 15.8 | 30 | 26.8 | 65.8 | 26.6 | 6.1 | 1.5 |
| VI | Bis(2-picoline-N-oxide)nickel [3] | 0–10 | 60 | 9.6 | 65.0 | 31.8 | 3.2 | 0.0 |
| VII | Bis(3-picoline-N-oxide)nickel [3] | 0–10 | 60 | 16.4 | 67.0 | 28.7 | 4.3 | 0.0 |
| VIII | Bis(4-picoline-N-oxide)nickel [3] | 0–10 | 60 | 22.2 | 66.4 | 27.6 | 6.0 | 0.0 |
| IX | Bis[2,2'-thiobis[4-(1,1,3,3-tetramethylbutyl)phenol]]nickel | 15.8 | 30 | 16.0 | 66.3 | 24.4 | 7.2 | 2.1 |
| X | [2,2'-thiobis[4-(1,1,3,3-tetramethylbutyl)phenol]ato(2-)](butylamine)nickel | 15.8 | 30 | 31.2 | 69.5 | 23.1 | 6.3 | 1.1 |

[1] After hydrogenation.
[2] Temperature of water bath in which reaction flask was contained.
[3] Only 1.0 millimole of EADC used in this run.

EXAMPLE XI

Codimerization of ethylene and butene-1

Into a nitrogen-flushed autoclave was charged 0.0303 (0.1 mmole) of bis(picolinato)nickel followed by 30.85 g. butene-1 and 2.0 ml. of a one molar solution of ethylaluminum dichloride in chlorobenzene. Ethylene was pressured in at 60 p.s.i.g.

The reaction was allowed to proceed for about 70 minutes at about 85° F. at which time 4 ml. more of the EADC solution was added and the ethylene pressure was increased to 100–150 p.s.i.g. After another 28 minutes the reaction was terminated by the addition of 20 ml. water.

The $C_6$ olefin fraction was isolated by distillation from hte reaction mixture and amounted to 13.6 g. A hydrogenated sample of this fraction showed the presence of 63.2 weight percent n-hexane, 36.4 weight percent 3-methylpentane, and 0.4 weight percent 2-methylpentane.

Thus, this example demonstrates that the invention catalyst system is also capable of codimerizing a mixture of two olefins.

EXAMPLE XII

Dimerization of linear heptenes

In a manner essentially identical with that of Example II, 0.1 mmole bis(picolinato)nickel and 1.5 mmole EADC were used to dimerize a mixture of linear $C_7$ olefins run at room temperature. A sample of the reaction mixture taken after about four hours showed the presence of $C_{14}$ olefins.

EXAMPLE XIII

Dimerization of pentene-2

In a similar manner, 0.1 mmole of bis(picolinato) nickel and 10 mmoles of EADC were contacted with 32.9 g. pentene-2 at 50° C. for three hours. Analysis showed that the conversion was 89.8%, the per pass yield of dimers ($C_{10}$ olefins) was 44.4%, and the ultimate yield of dimers was 49.5%.

EXAMPLE XIV

Dimerization of butene-1

A 0.1212 g. (0.4 millimole) quantity of bis(picolinato) nickel was charged into a 10 oz. reaction flask. Butene-1 was then pressured in at 5 p.s.i.g. and 6 ml. of a 1 molar solution of ethylaluminum dichloride in cyclohexane was added. The butene-1 pressure was then increased at 20 p.s.i.g. and the reaction mixture was allowed to stir for 6 hours at 25° C. The reaction was then terminated by the addition of 20 ml. water.

The organic phase was decanted and distilled yielding 5.06 g. of dimers, 1.66 g. of an intermediate cut, and 7.72 g. of higher oligomers having an average molecular weight of 309.

This run illustrates that, in some instances, substantial amounts of higher oligomers such as trimers, tetramers, pentamers, and the like can be formed in addition to dimers.

EXAMPLE XV

Noninvention catalyst system

In this example a comparative propylene dimerization run, essentially identical to those of preceding examples, was made with a nickel complex outside the scope of the present invention.

To a dry 7-oz. reaction flash, equipped with magnetic stirrer, were added 0.402 millimole of bis(o-phenylenebisdimethylarsine)dichloronickel and 20 ml. chlorobenzene. The solution was saturated with propylene and 6.0 millimoles EADC were added. The reaction mixture, in a water bath at 13.5° C., was stirred for 25 minutes under a propylene pressure of 30 p.s.i.g. A negligible amount of propylene was absorbed. Another 6 millimoles EADC were added and the reaction allowed to continue another 80 minutes but still the amount of propylene reacted was very low. It was estimated that less than 1 g. of dimers were produced from the run.

This run illustrates that not every nickel complex is suitable for use in catalyst systems for dimerizing olefins. Despite longer reaction time and a greater catalyst concentration, only a negligible amount of product was obtained.

Although this invention has been described in considerable detail, it must be understood that such detail is for the purposes of illustration only and that many variations and modifications can be made by one skilled in the art without departing from the scope and spirit thereof.

I claim:

1. A method for the dimerization of monoolefins having up to 12 carbon atoms per molecule which comprises mixing said monoolefin, under dimerization conditions, with a catalyst consisting essentially of a nickel complex from one of the following:

(a) a N,N-dihydrocarbyldithiocarbamato nickel complex having the formula

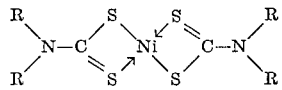

wherein R is an alkyl, aryl or a cycloalkyl radical, or a combination thereof having from 1 to 12 carbon atoms;

(b) a bis-pyridinecarboxylato nickel complex having the formula

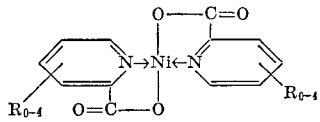

wherein R is as defined in (a);

(c) a thiobisphenol nickel complex having the formula

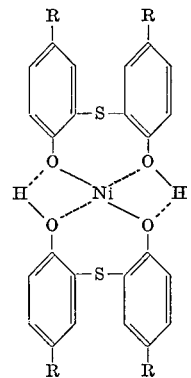

wherein R is as defined in (a);

(d) a thiobisphenol nickel amine complex having the formula

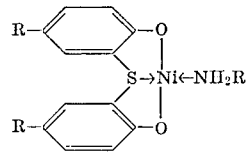

wherein R is as defined in (a); or (e) an amine-N-oxide nickel complex having the formula

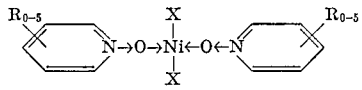

wherein R is as defined in (a) and X is a halide or alkoxide in combination with an organoaluminum compound having the formula $R_nAlY_m$ wherein R is as defined in (a) and Y is a halogen and $n$ can be the integer 1, 2, or 3, $m$ can be 0 or the integer 1 or 3 and $n$ plus $m$ equals 3.

2. The method of claim 1 comprising 0.5 to 20 moles of said organoaluminum compound per mole of said nickel complex.

3. The method of claim 2 wherein the dimerization is carried out at a temperature of from about −80 to about 200° C. and at a pressure sufficient to maintain the materials substantially in the liquid phase.

4. The method of claim 3 wherein said organoaluminum compound is ethylaluminum dichloride.

5. The method of claim 3 wherein said nickel complex is bis(di-n-butyl-dithiocarbamato)nickel.

6. The method of claim 3 wherein said nickel complex is bis(picolinato)nickel.

7. The method of claim 3 wherein said nickel complex is bis[2.2′ - thiobis[4 - (1,1,3,3-tetramethylbutyl)phenyl]] nickel.

8. The method of claim 3 wherein said nickel complex is [2,2′-thiobis][4 - 1,1,3,3 - tetramethylbutyl)phenyl]ato (2-)](butylamine)nickel.

9. The method of claim 3 wherein said nickel complex is bis(2-picoline-N-oxide)nickel, bis(3-picoline-N-oxide) nickel or bis(4-picoline-N-oxide)nickel.

(References on following page)

References Cited

UNITED STATES PATENTS

| | | | |
|---|---|---|---|
| 3,215,717 | 11/1965 | Foster | 260—439 |
| 3,321,546 | 5/1967 | Roest et al. | 260—683.15 |
| 3,355,510 | 11/1967 | Cannell et al. | 260—683.15 |
| 3,390,160 | 6/1968 | Heller et al. | 260—439X |
| 3,409,681 | 11/1968 | Kroll | 260—666 |
| 3,412,174 | 11/1968 | Kroll | 260—683.9 |
| 3,446,871 | 5/1969 | Maxfield | 260—683.15 |

FOREIGN PATENTS

| | | | |
|---|---|---|---|
| 62,561 | 7/1968 | Germany | 260—683.15 |
| 1,532,658 | 6/1968 | France | 260—683.15 |

PAUL M. COUGHLAN, Jr., Primary Examiner

U.S. Cl. X.R.

252—431; 260—439, 666

UNITED STATES PATENT OFFICE

CERTIFICATE OF CORRECTION       18937 LHC

Patent No.   3,558,738                                  Dated:  Jan. 26, 1971

It is certified that error appears in the above-identified patent and that :
Letters Patent are hereby corrected as shown below:

Claim 1, col. 8, line 51, after "or" and before "and", "3" should be

--- 2 ---.

Signed and sealed this 3rd day of October 1972.

(SEAL)
Attest:

EDWARD M.FLETCHER,JR.                    ROBERT GOTTSCHALK
Attesting Officer                        Commissioner of Patents